United States Patent
Buss et al.

(10) Patent No.: US 6,264,359 B1
(45) Date of Patent: Jul. 24, 2001

(54) ROTATABLE COMPOSTER

(75) Inventors: Melvin H. Buss, Burlington; Michael Thomas Heath, Hinesburg, both of VT (US)

(73) Assignee: America's Gardening Resource, Inc., Burlington, VT (US)

( * ) Notice: Subject to any disclaimer, the term of this patent is extended or adjusted under 35 U.S.C. 154(b) by 0 days.

(21) Appl. No.: 09/107,957

(22) Filed: Jun. 30, 1998

Related U.S. Application Data

(60) Provisional application No. 60/053,355, filed on Jul. 22, 1997.

(51) Int. Cl.[7] ....................................................... B01F 9/00
(52) U.S. Cl. .................. 366/220; 206/459.1; 435/290.3; 116/307
(58) Field of Search .................................... 366/219, 220, 366/232, 233, 53, 54, 221–231, 234–236; 220/671; 206/459.5, 459.1; 40/111, 114, 484, 493; 4/DIG. 12; 422/209; 414/149; 435/290.3; 210/91; 116/299, 308, 306, 309, 307; 68/149

(56) References Cited

U.S. PATENT DOCUMENTS

| | | | |
|---|---|---|---|
| 2,296,551 | * | 9/1942 | Ylio . |
| 2,565,385 | * | 8/1951 | Lupo . |
| 3,197,029 | * | 7/1965 | Yelinek . |
| 3,607,703 | * | 9/1971 | Hadley . |
| 3,837,810 | * | 9/1974 | Richards et al. . |
| 3,964,428 | * | 6/1976 | Arai . |
| 3,966,415 | | 6/1976 | Chester . |
| 4,687,645 | | 8/1987 | Harvey . |
| 4,750,840 | * | 6/1988 | Bishop . |
| 5,234,833 | | 8/1993 | Artis . |
| 5,288,146 | | 2/1994 | Baldwin . |
| 5,345,620 | | 9/1994 | Sundberg . |
| 5,457,031 | | 10/1995 | Masse . |
| 5,470,747 | | 11/1995 | Sikorski . |
| 5,501,978 | | 3/1996 | Sundberg . |
| 5,558,227 | * | 9/1996 | Hakamada . |

FOREIGN PATENT DOCUMENTS

| | | |
|---|---|---|
| 684269 | 8/1994 | (CH) . |
| 179362 | 4/1986 | (EP) . |
| 210382 | 2/1987 | (EP) . |
| WO 93/15033 | 8/1993 | (WO) . |

* cited by examiner

*Primary Examiner*—Joseph W. Drodge
*Assistant Examiner*—Terry K. Cecil
(74) *Attorney, Agent, or Firm*—Downs Rachlin & Martin PLLC

(57) ABSTRACT

A manually rotatable composter 100 including a container 12 having an opening 110 for receiving compostable material. The container includes an outer surface having end sections attached thereto and a plurality of steps 20 capable of accommodating a hand or foot of a person in order to apply a rotational force to manually rotate the container. The steps can be in the form of pockets or protrusions. Indicia 28 can also be included for indicating the rotational state of the composer.

19 Claims, 4 Drawing Sheets

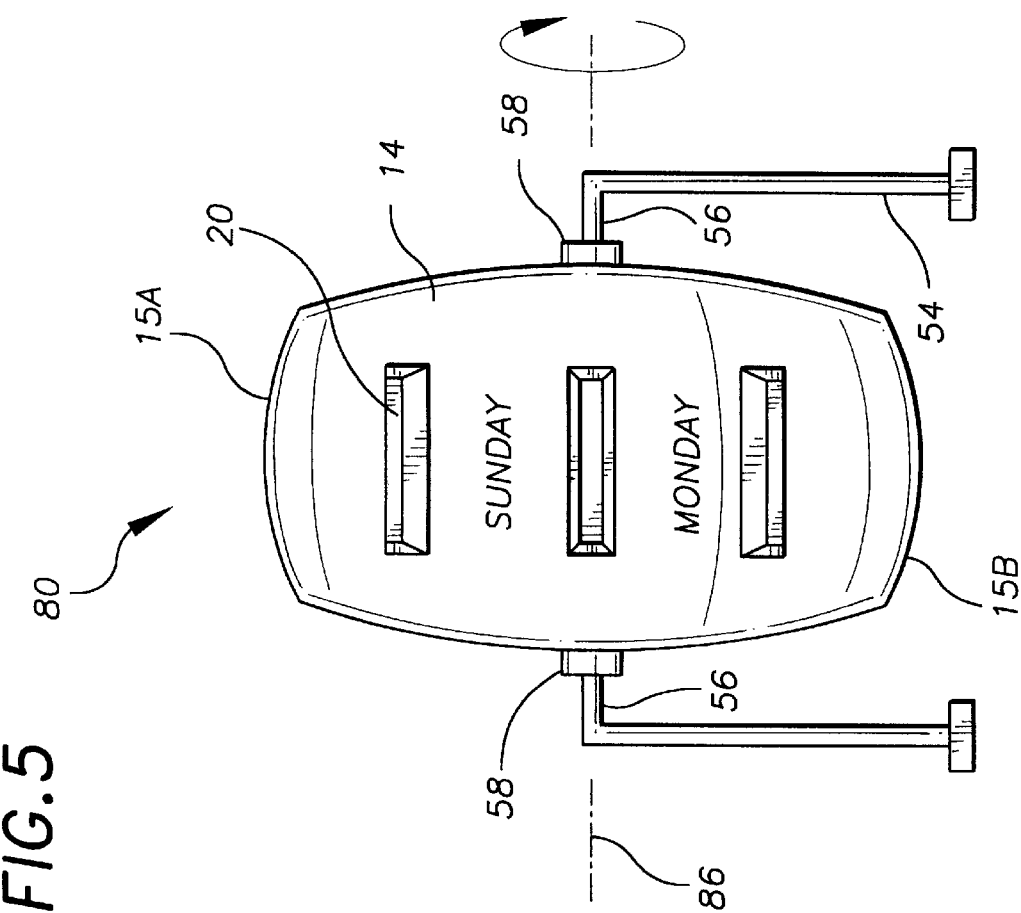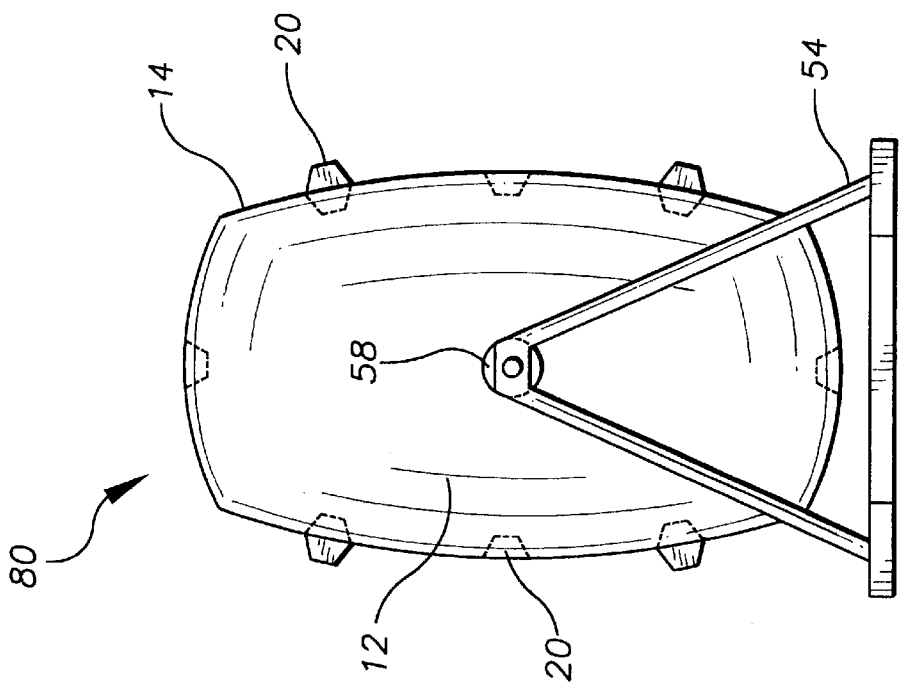

ROTATABLE COMPOSTER

This application claims the benefit of U.S. provisional application 60/053,355, filed Jul. 22, 1997

FIELD OF THE INVENTION

The present invention relates to composters, and more particularly to composters that are manually rotatable to facilitate composting.

BACKGROUND OF THE INVENTION

Composters are used to rapidly and efficiently decompose organic matter such as leaves, grass clippings, household waste, and the like. The composting process is facilitated by periodically breaking up and mixing the compost material within the composter. This can be accomplished directly, such as manually with a shovel, or by rotating the composter. However, manually rotating a composter having large amounts of compost material tends to be very difficult, especially when a significant portion of the originally loose organic matter has decomposed into denser compost material.

There are several prior art designs for rotatable composters. However, prior art rotatable composters lack the appropriate leverage means necessary for a person to easily manually rotate the composter when it contains relatively dense compost material. For example, U.S. Pat. No. 5,288,146 ("the '146 patent") discloses a rotatable composter having a cylindrical body which is rotatable about its long axis, and which includes slots in the cylindrical body for collecting rainwater, and two-by-fours disposed along the length of the cylindrical body for providing structural rigidity. However, these slots and two-by-fours are not suitable as hand-holds or foot-holds for manually rotating the composter, and no mention is made of using them as such.

Another type of rotatable composter is disclosed in U.S. Pat. Nos. 5,501,978 and 5,345,620 (collectively, "the '978 patent"). The '978 patent discloses a rotatable aeration drum for a composting toilet. The drum includes diametrically opposing elongate indentations extending radially inwardly from the wall of the drum to assist in lifting solid waste matter within the drum during rotation of the drum. The drum is rotated via a handle connected to a gear which intermeshes with a cogwheel disposed about the perimeter at one end of the drum. While these indentations appear to resemble hand-holds or foot-steps, they are actually for facilitating mixing of the compost material within the drum when the drum is rotated via the handle. Moreover, the indentations are not accessible for manual rotation of the drum because the drum is enclosed in a housing.

A rotable composter is also described in U.S. Pat. No. 4,687,645, wherein the composter drum is mounted on a horizontal transverse axis at the drum's midpoint. The drum is held above the ground at a height sufficient to allow rotation of the drum without it hitting the ground. However, manual rotation of the drum is apparently accomplished by a person grasping the edges of the drum. This operation is not only awkward, but potentially dangerous because the composting material within the drum can rapidly shift, leaving the person in a difficult position to apply the appropriate counter-force needed to prevent the drum from rapidly rotating.

SUMMARY OF THE INVENTION

The present invention relates to composters, and more particularly to composters that are manually rotatable to facilitate composting. Such composters are difficult to manually rotate when the composter container holds substantial amounts of compost material. The present invention is a rotatable composter with steps (i.e., hand-holds or foot-holds) designed so as to allow a person to readily rotate the composter container even when it contains a large amount of relatively dense compost material.

Accordingly, one aspect of the present invention is a manually rotatable composter, comprising a container having an axis of rotation, an interior for receiving compostable material, and an outer surface. The container includes a plurality of steps, which are capable of accommodating a hand or foot of a person. These steps may each be a pocket in the outer surface extending radially inwardly toward the axis. Alternatively, the steps may each be a protrusion in the outer surface extending radially outwardly toward the axis. Thus, to rotate the composter, a person inserts a hand or a foot into or onto a step, and exerts a force substantially tangential to the outer surface of the container. By having such a secure hand-hold or foot-hold, an amount of leverage sufficient to readily manually rotate the container is achieved.

In another aspect of the invention, the composter of the present invention includes a support member for supporting the outer surface of the container to permit the container to be rotated. This support member may be, for example, a pedestal.

In a further aspect of the invention, the composter of the present invention includes a support member for supporting the container at the axis of rotation to permit the container to be rotated. In this regard, the container may have a long dimension and a short dimension, and the container may be rotated about either axis In another aspect of the invention, the composter of the present invention further includes indicia on the outer surface of the container for indicating the rotational state of the composter. Such indicia may be, for example, days of the week. If desired, each of the plurality of steps may be associated with a corresponding one of the indicia. Such indicia allows for the rotational state of the composter to be tracked over time, allowing for optimization of the composting process.

BRIEF DESCRIPTION OF THE DRAWINGS

FIG. 5 is a side view of a third preferred embodiment of the rotatable composter of the present invention;

FIG. 6 is an end view of the composter of FIG. 5; and

DETAILED DESCRIPTION OF THE INVENTION

Figure 2:
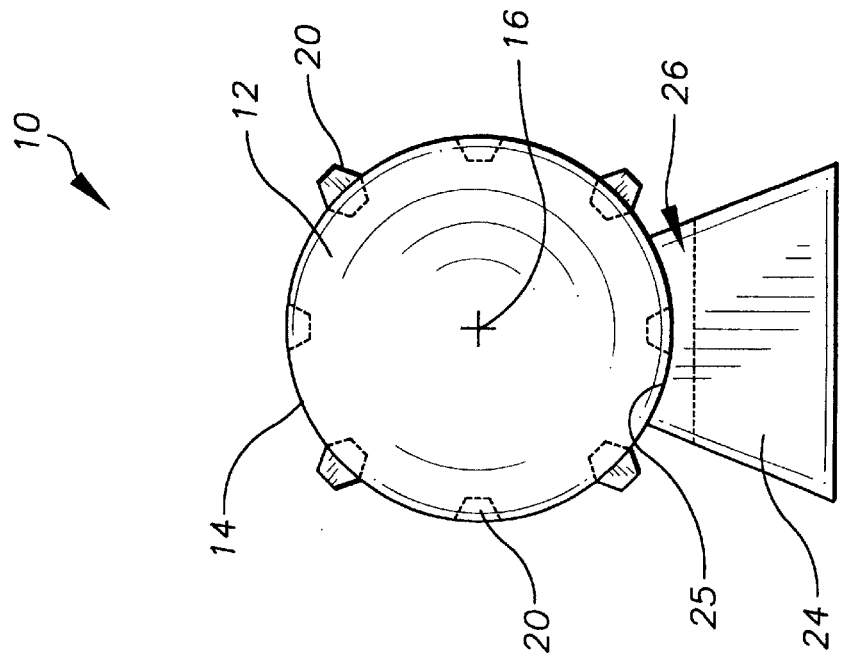
FIG. 2 is an end view of the composter of FIG. 1.
Figure 1:
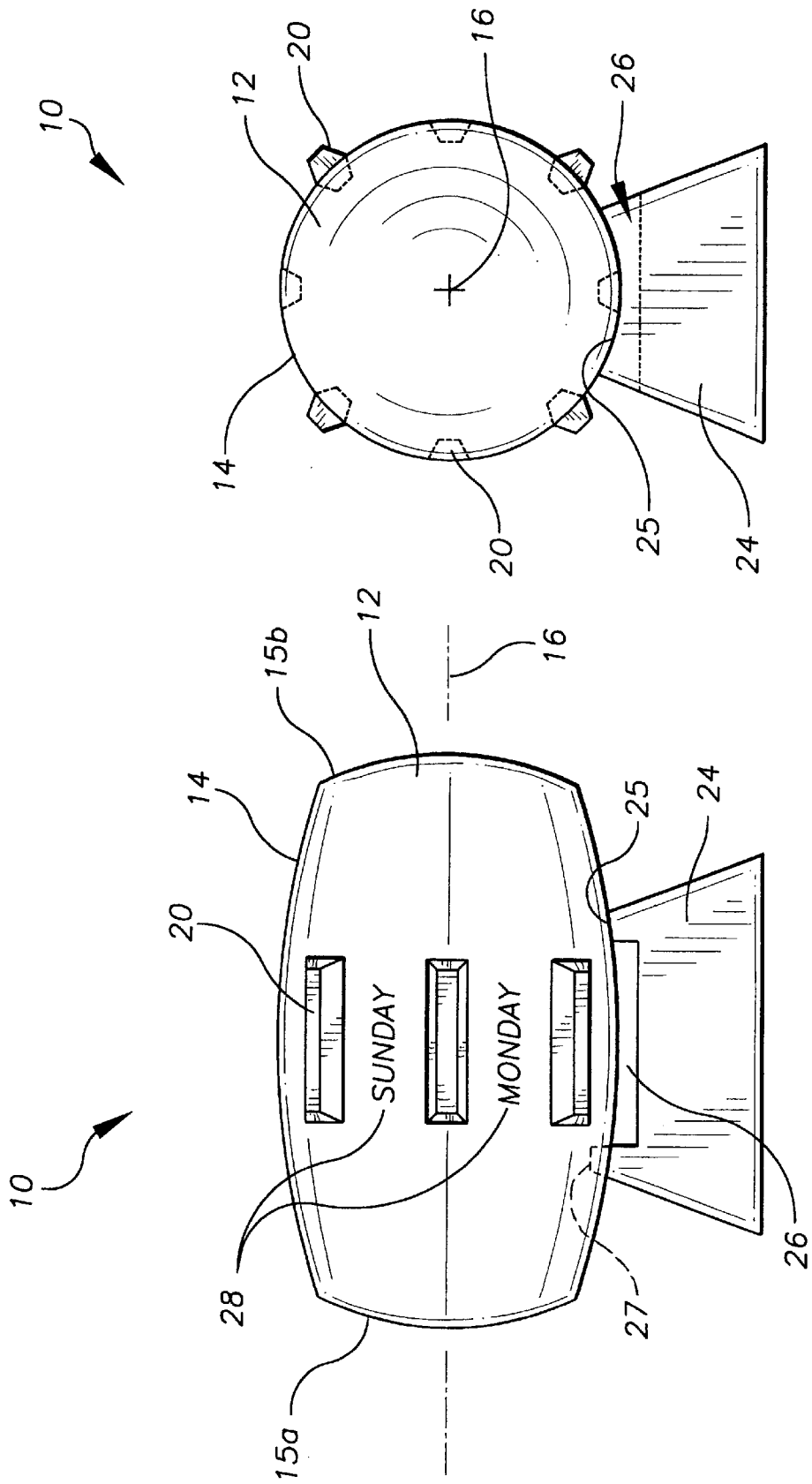
FIG. 1 is a side view of a first preferred embodiment of the rotatable composter of the present invention.

The present invention relates to composters, and more particularly to composters that are manually rotatable to facilitate composting. With reference to FIGS. 1 and 2, composter 10 of the present invention comprises a container 12 having an outer surface 14 and ends 15a and 15b. Container 12 is preferably rotationally symmetric in shape with a long dimension and a short dimension to facilitate rotation about an axis 16 along the long dimension, as shown. Container 12 includes a sealable opening (not shown) at one of ends 15a and 15b or in outer surface 14, for depositing and enclosing compostable organic matter within the container. Surface 14 surrounds axis 16 and may extend parallel to axis 16 (i.e., have a cross-section that is constant in size and shape, like that of a cylinder) or may be curved with respect to axis 16 (i.e., like that of an ellipsoid, as shown).

Composter 10 also includes a plurality of steps 20. Steps 20 may each be a pocket in surface 14 extending radially inwardly toward axis 16 wherein each pocket is formed by a continuous wall surrounding a bottom surface. Alternatively, steps 20 may each be a protrusion in surface 14 extending radially outwardly away from axis 16 wherein each protrusion is formed by a continuous wall surrounding the periphery of a top surface. In some cases, a given composter 10 may include both recessed and protruding steps 20. Steps 20 may be formed directly in or on surface 14, or may comprise separate structure attached to surface 14. In any case, it is preferred steps 20 be capable of accommodating a hand or foot of a person.

In a preferred embodiment, steps 20 are located at or near the middle of container 12 and surround axis 16. This location of steps 20 provides the best opportunity for obtaining the leverage needed to rotate container 12. However, other locations for steps 20 are also encompassed by the present invention.

With continued reference to FIGS. 1 and 2, composter 10 preferably further includes a support member 24 for supporting container 12 so as to permit the container to be rotated about axis 16. Support member 24 has a surface 25 that slidingly engages surface 14 of container 12. The coefficients of friction of surfaces 14 and 25 are chosen so that container 12 may be relatively easily rotated with respect to support member 24. Support member 24 may have various configurations including, for example, a pedestal configuration, as shown.

In the case where steps 20 are protrusions, it is preferred that support member 24 not interfere with the rotation of container 12. This may be accomplished, for example, by providing support member 24 with an aperture 26, as shown, through which protrusion-type steps 20 may pass during rotation of container 12. Support member 24 may also include a ratchet member 27 which allows for rotation of container 12 only in one direction. This prevents container 12 from counter-rotating after it has been rotated in a particular direction.

Because rotatable composters are rotated to facilitate mixing, it is often useful to know the rotational state of the composter, i.e., when it was last rotated relative to a given position, and how much the composter was last rotated. Toward this end, composter 10 may further include indicia 28 provided on surface 14, such as written words or symbols which allow a user to determine the rotational state of the composter. For example, as shown in FIG. 1, indicia 28 may be the days of the week. Preferably, indicia 28 are evenly distributed about axis 16 so that the spacing between any two indicia is substantially the same as the spacing between any other two indicia. In some cases it may be desirable to select the same number of steps 20 and indicia 28, so that a step is associated with each indicia. Alternatively, indicia 28 may be a series of numbers, letters or other symbols. The specific number of indicia 28 preferably ranges from 5 to 10, but greater and lesser numbers of indicia are also encompassed by the present invention.

Figure 3:
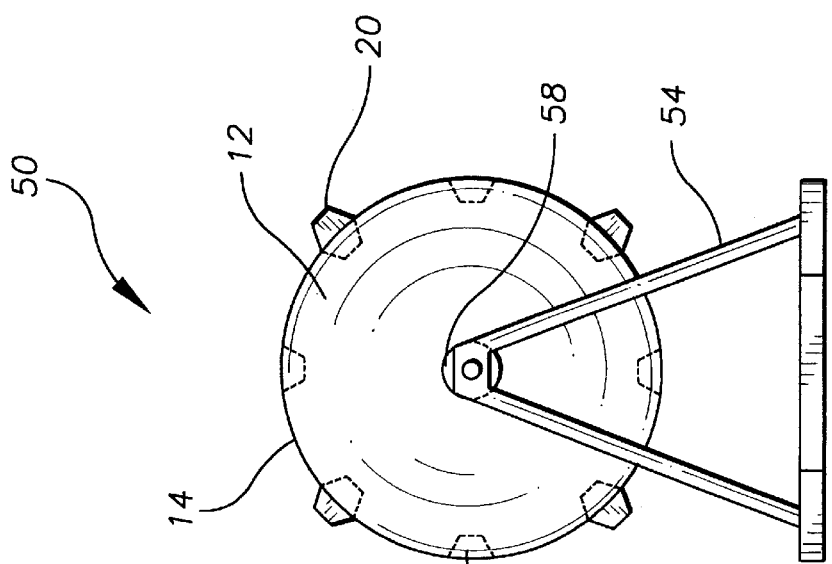
FIG. 3 is a side view of a second preferred embodiment of the rotatable composter of the present invention.
Figure 4:
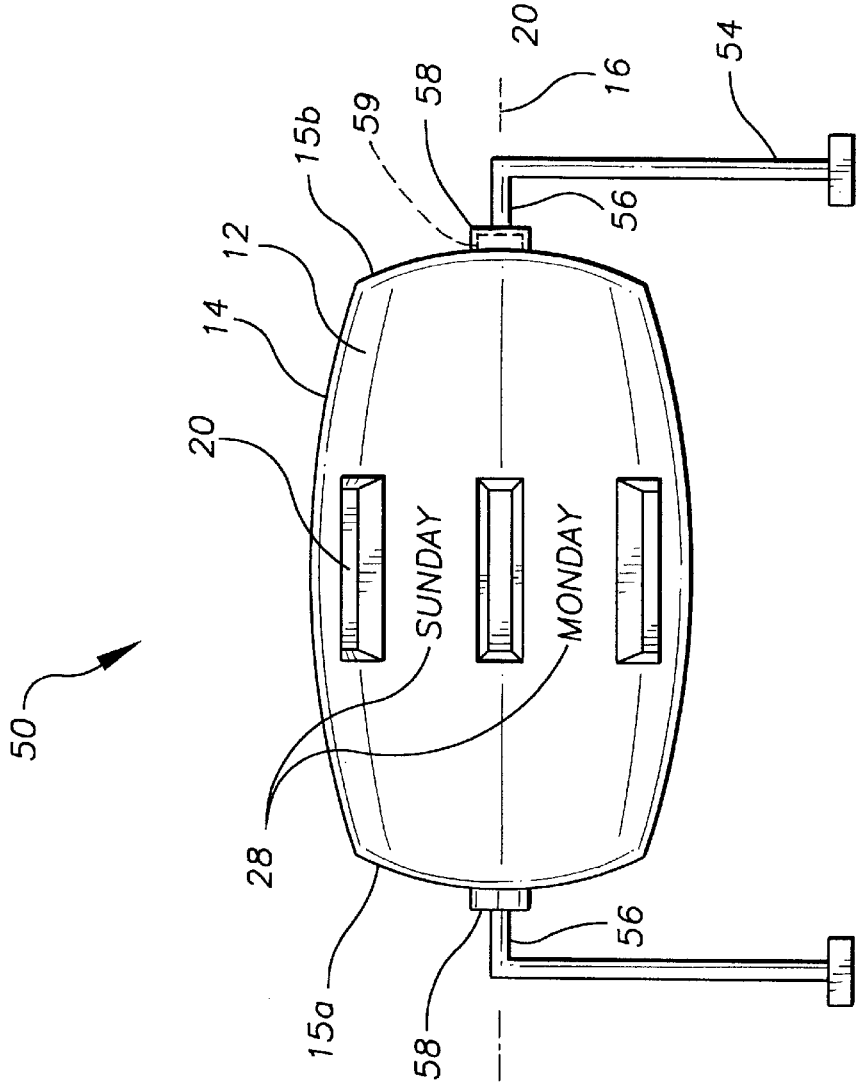
FIG. 4 is an end view of the composter of FIG. 3.

With reference now to FIGS. 3 and 4, composter 50 is a second preferred embodiment of the present invention. Composter 50 is the same as composter 10 of FIGS. 1 and 2, except that instead of container 12 being supported at surface 14, e.g., by support member 24, a support member 54 supports the container at axis of rotation 16. Support member 54 includes horizontal shafts 56 each of which are journaled to a bearing 58 located at each of ends 15a and 15b of container 12 along axis 16. Bearings 58 allow for rotation of container 12 about axis 16. Bearings 58 may also include a ratchet member 59 which allows for rotation of container 12 only in one direction. This prevents container 12 from counter-rotating after it has been rotated in a particular direction.

With reference now to FIGS. 5 and 6, composter 80 is similar to composter 50 of FIGS. 3 and 4, except that container 12 is rotatable about an axis 86 along the short dimension of the container. Also, bearings 58 are located on surface 14 so as to lie on axis 86. Moreover, steps 20 are aligned along the long dimension of container 12 and surround axis 86.

Figure 7:
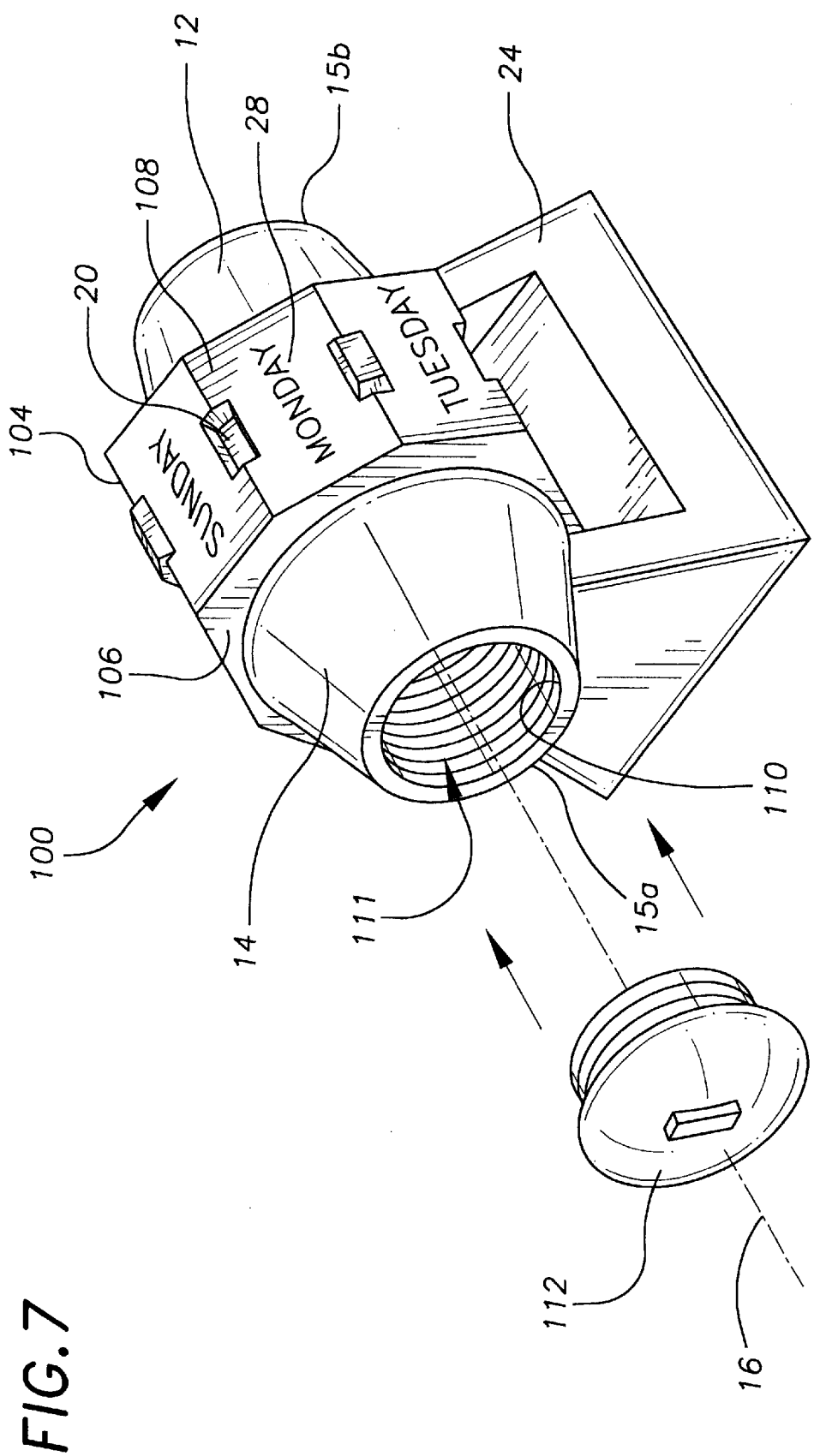
FIG. 7 is a perspective view of a working example composter of the present invention.

A working example of the rotatable composter present invention is now described. With reference to FIG. 7, there is shown a composter 100 similar to composter 10 of FIG. 1. In composter 100, container 12 includes an aperture 110 at end 15a, and an interior 111. Aperture 110 is sealable with a lid 112. In addition, a portion of surface 14 includes an outer region 104 extending radially outwardly therefrom. Region 104 is polygonal in cross-section and includes a plurality of vertices 106 and faces 108. Pocket-type or protrusion-type steps 20 are located in outer region 104 at vertices 106 extending along only a minor portion thereof. Composter 100 further includes indicia 28, shown as words indicating the days of the week, inscribed on faces 108. In a preferred embodiment, region 104 has a septagonal cross-section, with seven vertices 106 and seven faces 108, one for each day of the week. Thus, a unique indicia 28 is associated with each step 20.

The operation of the rotatable composter of the present invention is first described with reference to the working example shown in FIG. 7. As the first step in operating composter 100, the compostable material to be composted is placed into interior 111 of container 12 through aperture 110. Then, aperture 110 is sealed with lid 112. After a given amount of time passes, it will be advantageous to rotate container 12 of composter 100 to facilitate the composting process. Accordingly, a person (not shown) places a hand or foot into one of steps 20 (or two hands into respective steps 20, or one hand and one foot into respective steps 20, etc.) and exerts a force substantially tangential to surface 14. Typically, this force is applied in a downward direction, although it may be applied in an upward direction if desired.

In operating composter 10, a person determines the rotational state of the composter by examining the position of indicia 28 relative to a fixed location, e.g., an edge of support member 24. For example, when indicia 28 represent the days of the week, the user rotates composter 10 so that the given day of the week is positioned in selected relation to the selected comparison location.

Prior to or after rotating container 12, it may be desirable to add more compostable organic matter to the container. If so, lid 112 is removed and more vegetative matter or the like is added to interior 111 of container 12, as described above. The rotation process is repeated every so often (e.g., daily), until the compostable organic matter within container 12 is substantially completely decomposed to compost material.

The ability to track the rotational state of the composter over time allows for the optimization of the composting process.

Operation of the other embodiments of the composter of the present invention, i.e., composter 10, composter 50 and composter 80, proceeds substantially in the same manner described above with respect to composter 100. As such, the description is not repeated for these embodiments.

An important advantage of the composter of the present invention is that steps 20 aid a user in rotating the composter a controlled amount in a controlled fashion. Also, the provision of indicia 28 aids a user of the composter in rotating the composter amount that optimizes the composting process. With prior art composters, it tends to be difficult for a user to readily determine when, and the amount to which, the composter was last rotated.

While the present invention have been described in connection with preferred embodiments and a working example, it will be understood that it not so limited. On the contrary, it is intended to cover all alternatives, modifications and equivalents as may be included within the spirit and scope of the invention as defined in the appended claims.

What is claimed is:

1. A manually rotatable composter, comprising:
   a. a rotatable container having a horizontal axis of rotation, a cylindrical wall with first and second ends, and first and second end sections connected to, respectively, said first and second ends, said cylindrical wall and said first and second end sections defining an interior space for receiving compostable matter;
   b. a plurality of pockets substantially centered between said end sections and spaced about said horizontal axis, wherein said pockets are configured to accommodate at least a portion of a hand or foot of a person for application of a rotational force to manually rotate said container, each said pocket being formed of a bottom surface and a continuous wall surrounding said bottom surface;
   c. an opening formed in said container for allowing access to said interior space; and
   d. a removable closure for blocking said opening.

2. A composter according to claim 1, further including a support member rotatably attached to said container for supporting said container so as to permit said container to be rotated about said axis of rotation.

3. A composter according to claim 1, wherein a support member is rotatably attached to said end sections so as to permit said container to be rotated about said axis of rotation.

4. A composter according to claim 2, wherein said support member is rotatably attached to said cylindrical wall so as to permit said container to be rotated about an axis extending transversely to said axis rotation.

5. A composter according to claim 3, further including a ratchet member for preventing counter-rotation of said container.

6. A composter according to claim 1, wherein said container has a long dimension and a short dimension and said axis of rotation is along said long dimension.

7. A composter according to claim 1, wherein said container has a long dimension and a short dimension and said axis of rotation is along said short dimension.

8. A composter according to claim 1, wherein said container includes an outer surface, said composter further including indicia on said outer surface for indicating the rotational state of the composter about said rotational axis.

9. A composter according to claim 8, wherein said indicia is associated with one or more of said plurality of pockets.

10. A composter according to claim 8, wherein each of said plurality of pockets is associated with a corresponding respective one of said indicia.

11. A composter according to claim 8, wherein said indicia is a plurality of symbols representing days of the week.

12. A composter according to claim 8, wherein said indicia includes ascending or descending sequence information for indicating the extent of change of rotational state of the composter relative to said rotational axis.

13. A composter according to claim 12, wherein said indicia is affixed to said outer surface.

14. A composter according claim 8, wherein said indicia comprises a plurality of symbols.

15. A composter according to claim 1, wherein said container includes an outer surface and a portion of said outer surface has a polygonal cross section and includes a plurality of vertices.

16. A composter according to claim 15, wherein said plurality of pockets are located at said plurality of vertices.

17. A composter according to claim 1, wherein said closure includes at least a portion of one of said first and second end sections.

18. A manually rotatable composter, comprising:
   a. a rotatable container having a horizontal axis of rotation, a cylindrical wall with first and second ends, and first and second end sections connected to, respectively, said first and second ends, said cylindrical wall and said first and second end sections defining an interior space for receiving compostable matter, further wherein said container includes an outer surface and a portion of said outer surface has a polygonal cross section including a plurality of vertices positioned between said first and second ends;
   b. a plurality of protrusions substantially centered between said end sections and spaced about said horizontal axis, each said protrusion located on and extending along only a minor portion of a respective one of said vertices, wherein said protrusions are configured to be engaged by a hand or foot of a person for application of a rotational force to manually rotate said container, each said protrusion being formed of a top surface having a periphery and a continuous wall surrounding said periphery;
   c. an opening formed in said container for allowing access to said interior space; and
   d. a removable closure for blocking said opening.

19. A composter according to claim 18, wherein said outer surface further includes indicia for indicating the rotational state of the composter.

* * * * *